N. W. PARKER.
BLOWER ATTACHMENT.
APPLICATION FILED JULY 25, 1914.
1,180,525.
Patented Apr. 25, 1916.
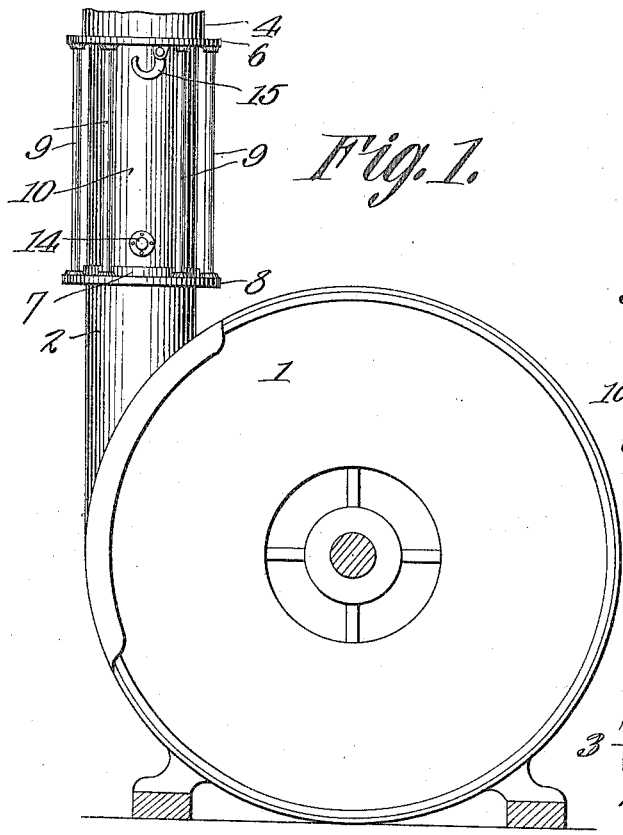
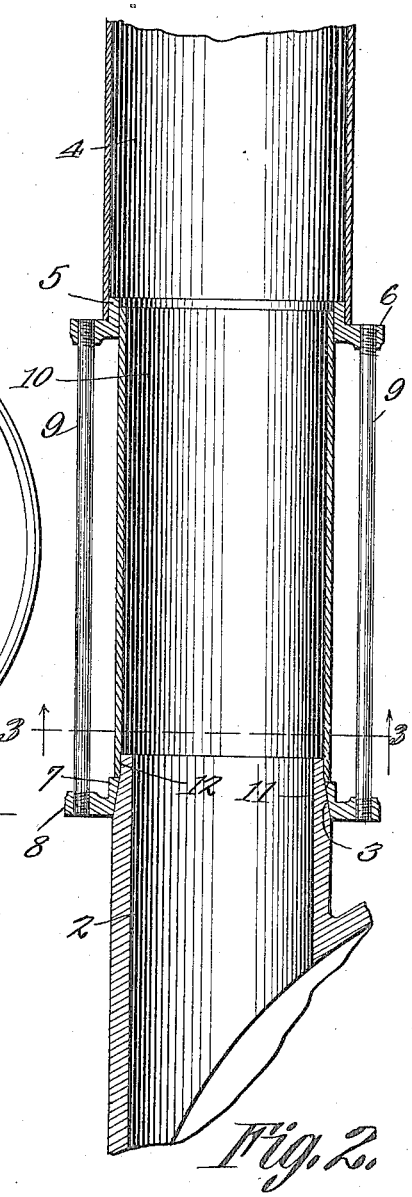
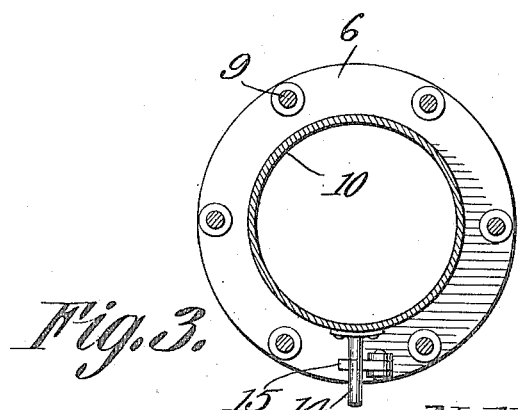
Nathaniel W. Parker
Inventor,
by C. A. Snow & Co.
Attorneys.
Witnesses

UNITED STATES PATENT OFFICE.

NATHANIEL W. PARKER, OF GRANVILLE, NEW YORK.

BLOWER ATTACHMENT.

1,180,525.     Specification of Letters Patent.     Patented Apr. 25, 1916.

Application filed July 25, 1914. Serial No. 853,240.

*To all whom it may concern:*

Be it known that I, NATHANIEL W. PARKER, a citizen of the United States, residing at Granville, in the county of Washington and State of New York, have invented a new and useful Blower Attachment, of which the following is a specification.

The device forming the subject matter of this application relates to blowers of that general type which are used in connection with the handling of ensilage.

By way of explanation it may be stated that the line pipe leading to an ensilage blower usually clogs up at the point where the line pipe communicates with the blower casing and it is at this point that the line pipe must be cleaned out frequently.

Recalling that the line pipe frequently is thirty feet or more in length and stands vertically, it will be understood that the lifting of the line pipe, to disconnect the same from the blower casing is a matter of no small difficulty. The present invention, therefore, aims to provide a means whereby the line pipe of a blower may be opened readily to effect a cleaning at a point adjacent the blower.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows the invention in side elevation; Fig. 2 is a fragmental longitudinal section; Fig. 3 is a cross section on the line 3—3 of Fig. 2.

In the accompanying drawings, the numeral 1 indicates a blower casing provided with a pipe 2 having a tapered end 3. The line pipe is shown at 4.

The invention contemplates the use of a frame comprising a primary collar 5 having a flange 6, a secondary collar 7 having a flange 8 and spaced connections 9 uniting the collars, any desired number of connections 9 being used. The secondary collar 7 surrounds the upper end of the blower pipe 2 and is supported by the tapered end 3, the primary collar 5 being supported by the connections 9, and the line pipe 4 being supported upon the flange 6 of the primary collar 5.

Fitting closely within the primary collar 5 but mounted to slide therein is a tube 10 which may be of any desired length. When the tube 10 is lowered, the same abuts as shown at 11, against the upper end of the secondary collar 7. The upper end of the pipe 2 is prolonged above the upper face of the secondary collar 7 so that when the tube 10 is lowered, the tube will surround the upper end of the pipe 2 and effect a perfect closure, as indicated at 12.

To facilitate the sliding movement of the tube 10 the same is equipped with a handle 14 of any desired sort. The primary collar 5 is supplied with a pivoted hook 15 or the like.

In practical operation, when it is desired to effect a cleaning of the blower line, the tube 10 is raised through the instrumentality of the handle 14, the tube sliding upwardly within the primary collar 5. The handle 14 may be engaged with the hook 15 and therefore the handle and the hook constitute interlocking elements for holding the tube spaced from the secondary collar 7. After the tube 10 has been raised, the pipe line may be cleaned out readily, the connections 9 being spaced sufficiently to allow the fan to remove the obstruction.

After the pipe line has been cleaned, the tube 10 is lowered into the position shown in Fig. 2, under which conditions the tube surrounds the upper end of the pipe 2 as shown at 12 and is supported by the secondary collar 7.

Having thus described the invention, what is claimed is:—

The combination with a blower, of a conduit; a telescoping section constituting a connection between the blower and the conduit and located adjacent the blower, the section being movable to open the conduit adjacent the blower; and a frame constituting at once a means for supporting the conduit on the blower and a guiding guard for the section.

In testimony that I claim the foregoing as my own, I have hereto affixed my signature in the presence of two witnesses.

NATHANIEL W. PARKER.

Witnesses:
MABEL L. PRITCHARD,
C. E. PARKER.

Copies of this patent may be obtained for five cents each, by addressing the "Commissioner of Patents, Washington, D. C."